United States Patent
Marable (10) Patent No.: US 10,077,801 B2
(45) Date of Patent: Sep. 18, 2018

(54) CONNECTING SYSTEM FOR CONNECTING A TENSIONING MEMBER TO A FREE-SPACE SHAFT

(71) Applicant: Joshua Manning Marable, Boulder, CO (US)

(72) Inventor: Joshua Manning Marable, Boulder, CO (US)

( * ) Notice: Subject to any disclaimer, the term of this patent is extended or adjusted under 35 U.S.C. 154(b) by 380 days.

(21) Appl. No.: 14/740,502

(22) Filed: Jun. 16, 2015

(65) Prior Publication Data
US 2015/0362007 A1 Dec. 17, 2015

Related U.S. Application Data (60) Provisional application No. 61/998,049, filed on Jun. 16, 2014.

(51) Int. Cl.
*A63B 69/00* (2006.01)
*F16C 11/06* (2006.01)
(Continued)

(52) U.S. Cl.
CPC .......... *F16C 11/0685* (2013.01); *A63B 15/00* (2013.01); *A63B 69/00* (2013.01); *F16C 11/0604* (2013.01); *F16C 11/0695* (2013.01); *F16G 11/00* (2013.01); *F16G 11/14* (2013.01); *F16M 11/14* (2013.01); *F16M 13/022* (2013.01); *A63B 21/00061* (2013.01); *A63B 21/0552* (2013.01); *A63B 21/0557* (2013.01);
(Continued)

(58) Field of Classification Search
CPC ..... Y10T 403/32196; Y10T 403/32631; F16C 11/06; F16C 11/0614; F16C 11/0695
See application file for complete search history.

(56) References Cited

U.S. PATENT DOCUMENTS 3,365,249 A 1/1968 McCloskey
4,428,688 A * 1/1984 McGregor, Jr. ....... F16C 23/045
384/207

(Continued)

OTHER PUBLICATIONS

TRX Rip Trainer, www.trxtraining.com, printed from the Internet on Jun. 10, 2015, 14 pp.

(Continued)

*Primary Examiner* — Frederick L Lagman
(74) *Attorney, Agent, or Firm* — James A. Sheridan; Sheridan Law, LLC (57) ABSTRACT

A connecting system for connecting a tensioning member to a free-space shaft may comprise an inner element having an element spherical outer surface truncated at opposite truncated ends and may include an element bore extending through the inner element and coaxial with the element spherical outer surface. The element bore may have a bore axis and a bore cross section sized and configured complementary to a shaft cross section of the free-space shaft. A retaining collar may include a collar spherical inner surface complementary to and configured to receive the element spherical outer surface, and may have opposing collar ends. The collar spherical inner surface may define a collar axis. The retaining collar may allow universal motion of the bore axis relative to the collar axis. The retaining collar may include an arching portion for connecting the tensioning member to the shaft.

18 Claims, 7 Drawing Sheets

(51) Int. Cl.
 *F16G 11/00*    (2006.01)
 *F16M 11/14*    (2006.01)
 *F16M 13/02*    (2006.01)
 *A63B 15/00*    (2006.01)
 *F16G 11/14*    (2006.01)
 *A63B 59/20*    (2015.01)
 *A63B 69/36*    (2006.01)
 *A63B 21/055*    (2006.01)
 *A63B 21/00*    (2006.01)
 *A63B 102/24*    (2015.01)
 *A63B 102/32*    (2015.01)
 *A63B 102/14*    (2015.01)
 *A63B 102/18*    (2015.01)
 *A63B 23/12*    (2006.01)

(52) U.S. Cl.
 CPC ....... *A63B 21/4043* (2015.10); *A63B 23/1209* (2013.01); *A63B 59/20* (2015.10); *A63B 69/0026* (2013.01); *A63B 69/3623* (2013.01); *A63B 2069/0008* (2013.01); *A63B 2102/14* (2015.10); *A63B 2102/18* (2015.10); *A63B 2102/24* (2015.10); *A63B 2102/32* (2015.10); *A63B 2209/02* (2013.01); *A63B 2209/10* (2013.01); *Y10T 403/32196* (2015.01); *Y10T 403/32631* (2015.01)

(56) References Cited

U.S. PATENT DOCUMENTS

| | | | |
|---|---|---|---|
| 5,265,965 A | | 11/1993 | Harris et al. |
| 5,482,379 A | | 1/1996 | Harris et al. |
| 5,524,987 A | * | 6/1996 | Vigeh .................. F16C 7/02 384/209 |
| 6,328,666 B1 | | 12/2001 | Manory |
| 7,407,451 B2 | | 8/2008 | Velasquez |
| 7,568,841 B2 | | 8/2009 | Wood, Jr. et al. |
| 7,749,110 B2 | | 7/2010 | Bozof |
| 8,251,877 B2 | | 8/2012 | Rasmussen et al. |
| 8,444,500 B2 | | 5/2013 | Erkkinen |
| 8,556,755 B1 | | 10/2013 | Zackery |
| 2002/0037117 A1 | * | 3/2002 | Sasaki ................ F16C 11/0614 384/208 |
| 2005/0196083 A1 | * | 9/2005 | Maasch ................ F16C 23/045 384/208 |
| 2009/0197711 A1 | | 8/2009 | Sommers et al. |
| 2011/0111889 A1 | | 5/2011 | Smyrnios |
| 2012/0202622 A1 | | 8/2012 | Sena |
| 2012/0258816 A1 | | 10/2012 | Celone et al. |
| 2013/0077904 A1 | * | 3/2013 | Jungeberg ........... F16C 11/0604 384/215 |
| 2014/0140755 A1 | * | 5/2014 | Clavijo Lumbreras ..................... F16C 11/0695 403/57 |
| 2015/0345547 A1 | * | 12/2015 | Jungeberg ........... F16C 11/0604 384/2 |

OTHER PUBLICATIONS

Bungee Bat, www.bungeebat.com, printed from the Internet on Jun. 10, 2015, 3 pp.
RBC Loader Slot Bearing, www.rbcbearings.com, printed from the Internet on Jun. 10, 2016, 1 pp.

\* cited by examiner

CONNECTING SYSTEM FOR CONNECTING A TENSIONING MEMBER TO A FREE-SPACE SHAFT

CROSS-REFERENCE TO RELATED APPLICATIONS

The present application claims priority to U.S. Provisional Application No. 61/998,049 filed on Jun. 16, 2014 and entitled CLIP, the entire contents of Application 61/998,049 being expressly incorporated by reference herein.

BACKGROUND

Resistance training for developing strength, agility, and/or accuracy in a stick sport, such as baseball, golf, or lacrosse, is accomplished using a variety of means, include methods involving elastic resistance bands attached to a training stick. Some solutions employ a simulated stick attached to an elaborate machine, such as in a golf swing training device, or employ a modified stick attached to a resistance band, such as a rod emulating a baseball bat. Unfortunately, these simulated methods don't allow the player to use his or her personal stick, or they limit the training location to wherever the machine is mounted. A simulator may not allow the player to develop accurate proprioceptive awareness of where his or her body is in space.

Other solutions attach weight, or a resistance band, to the shaft of a stick via a clamp, hole, Velcro®, or a U-bracket, thereby allowing the player to utilize a personal stick. Unfortunately, these methods may provide uneven resistance if the attachment mechanism, such as a clamp, cannot swivel freely during shaft rotation, lateral movement, or angular deviation of the stick, and may thereby transmit unnatural dynamics to the player. Alternatively, attaching a universal joint to a sport stick and to an elastic band may provide more realistic resistance dynamics. Regrettably, existing universal joints are designed to restrain a shaft which is linked to a motor or a machine, and are not designed for a universal range of motion over several feet of distance. Furthermore, prior art bearings are made of steel and optimized for high speed rotation. Additionally, the wearing components of the bearings must be co-formed in an expensive process; field repair or field assembly is generally not an option.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is disclosed a connecting system for connecting a tensioning member to a free-space shaft and which may comprise an inner element having an element spherical outer surface truncated at opposite truncated ends. The connecting system may include an element bore extending through the inner element and coaxial with the element spherical outer surface. The element bore may have a bore axis and a bore cross section sized and configured complementary to a shaft cross section of the free-space shaft. A retaining collar may include a collar spherical inner surface complementary to and configured to receive the element spherical outer surface, and may have opposing collar ends. The collar spherical inner surface may define a collar axis. The retaining collar may allow universal motion of the bore axis relative to the collar axis. The retaining collar may include an arching portion for connecting the tensioning member to the shaft.

In another embodiment, there is disclosed a connecting system for connecting a tensioning member to a free-space shaft and which may comprise an inner element having an element spherical outer surface truncated at opposite truncated ends. The connecting system may further include an element bore extending through the inner element and coaxial with the element spherical outer surface. The element bore may have a bore axis and be configured for receiving the free-space shaft. A retaining collar may have a collar spherical inner surface complementary to and configured to receive the element spherical outer surface. The retaining collar may have opposing collar ends. The collar spherical inner surface may define a collar axis and the retaining collar may allow universal motion of the bore axis relative to the collar axis. The retaining collar may further include an insertion slot gapping a perimeter of the spherical inner surface and extending radially outwardly by a slot depth to provide an insertion clearance for receiving the inner element sideways during insertion and removal. The insertion slot may have a gap width greater than an element length between the truncated ends. The slot depth may be sufficiently deep for the element spherical outer surface to clear an opening inner rim of the collar end when the inner element is moved along the collar axis into or out of the insertion clearance. The retaining collar may be oval shaped with an oval apex of the oval-shaped collar positioned over the insertion slot. The oval apex and the insertion clearance may together define an arching portion for connecting the tensioning member to the shaft.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

When elements are referred to as being "connected" or "coupled," the elements can be directly connected or coupled together or one or more intervening elements may also be present. In contrast, when elements are referred to as being "directly connected" or "directly coupled," there are no intervening elements present.

As may be appreciated, based on the disclosure, there exists a need in the art for a universal joint that can be temporarily mounted to a player's personal stick and attached to a tensioning band. Further, there exists a need in the art for a tensioning connector optimized for a free-space shaft that rotates about the shaft axis and deviates both axially and laterally by up to several feet. Also, there exists a need in the art for a tensioning connector that can be field assembled and field repaired. For example, the prior includes plain steel bearings not configured for sports sticks. Some have 1 or 2 insertion slots, allowing field replacement of the ball. However, all of these slotted bearings can only be inserted at one end of the bearing (collar) and require machining to create the insertion slot or slots. Furthermore, most slotted bearings have 2 insertion slots, unfortunately requiring a more complex retaining collar. The prior art having one insertion slot requires a key or an edge plate to secure the ball once inserted. Therefore, there exists a need in the art for a universal connector optimized for low-speed sports applications that can be formed without machining, field-assembled from either end of a retaining collar, and retained without additional components.

Referring to FIGS. 1, 2a-2b, 3a-3d, 4-5, 6a-6b, and 7, in various embodiments, a connecting system 10 for connecting a tensioning member 70 to a free-space shaft 80 in universal motion may comprise an inner element 12 having an element spherical outer surface 14 truncated at opposite truncated ends 20. An element bore 16 may extend through inner element 12 and may be coaxial with element spherical outer surface 14. Element bore 16 may have a bore axis 18 and a bore cross section 17 sized and may be configured complementary to a shaft cross section (not shown) of free-space shaft 80. Truncated ends 20 may each lie in a nominal plane of rotation (not shown) perpendicular to bore axis 18 and may be separated by an element length 22. (FIG. 3c, 5) Retaining collar 30 may have a collar spherical inner surface 32 complementary to and configured to receive element spherical outer surface 14. Collar 30 may have opposing collar ends 34. Collar spherical inner surface 32 may define a collar axis 38, and retaining collar 30 may allow universal motion of bore axis 18 relative to collar axis 38. Retaining collar 30 may include an arching portion 50 for connecting a tensioning member 70 to shaft 80.

Figure 1:
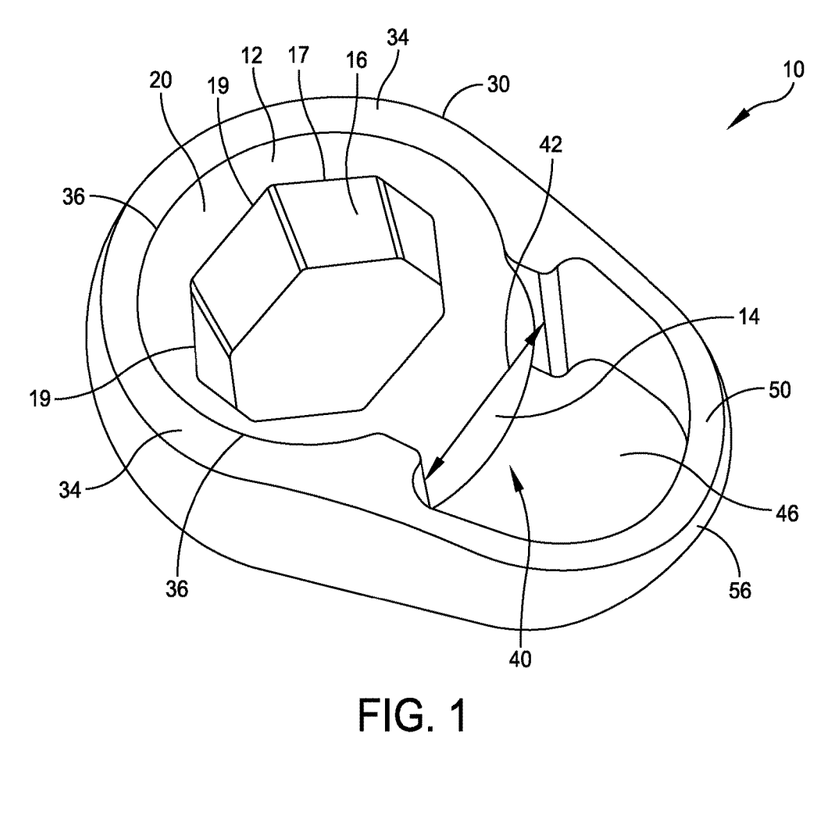
FIG. 1 illustrates an exemplary embodiment of a field-assembled two-piece bearing for connecting a tensioning member to a free-space shaft, in accordance with an embodiment of the present disclosure.
Figure 2A:
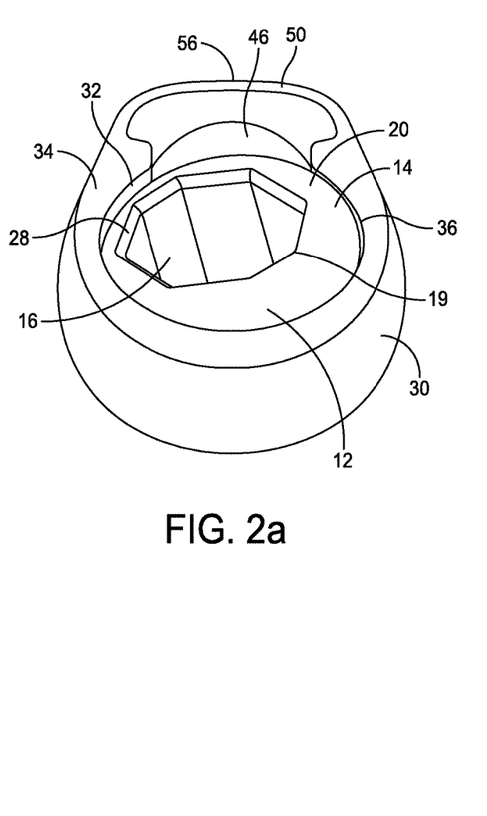
FIGS. 2a-2b illustrate an exemplary embodiment of a field-assembled two-piece bearing under axial deviation for connecting a tensioning member to a free-space shaft.
Figures 3A, 3B:
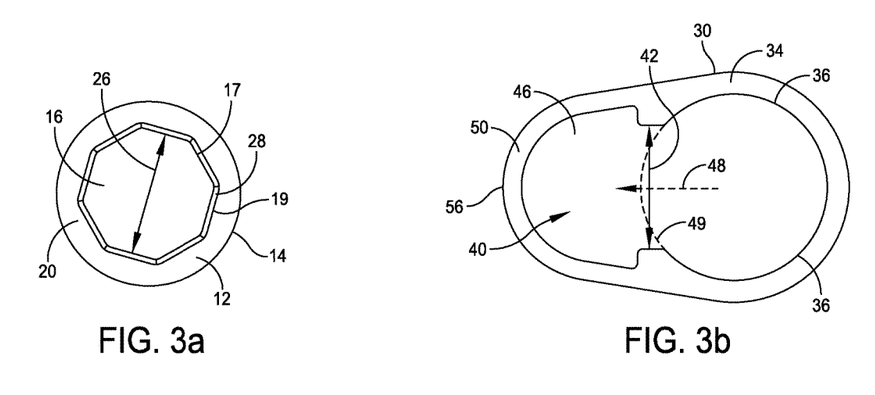
FIGS. 3a-3d illustrate an exemplary embodiment of the field assembly of a two-piece bearing for connecting a tensioning member to a free-space shaft.
Figures 3C, 3D:
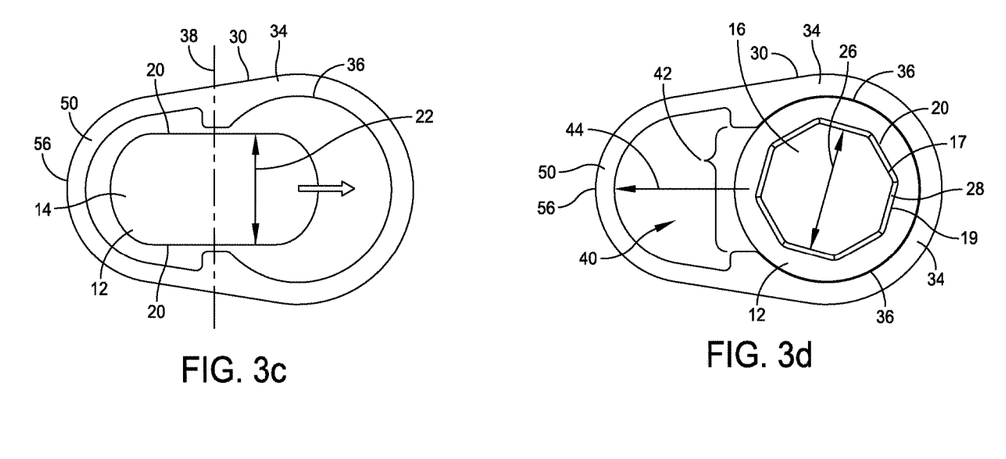
Figure 4:
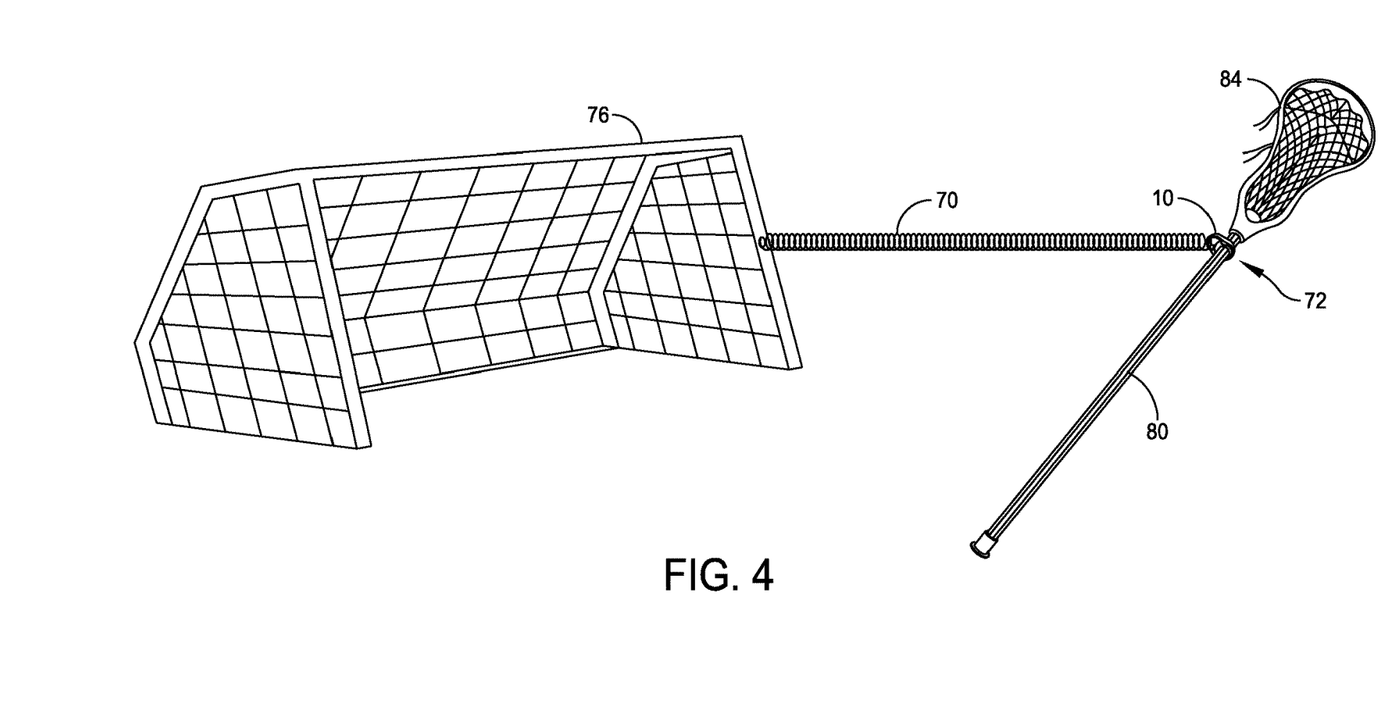
FIG. 4 illustrates an exemplary embodiment of an elastic band connecting to a lacrosse stick through a connecting system.
Figure 5:
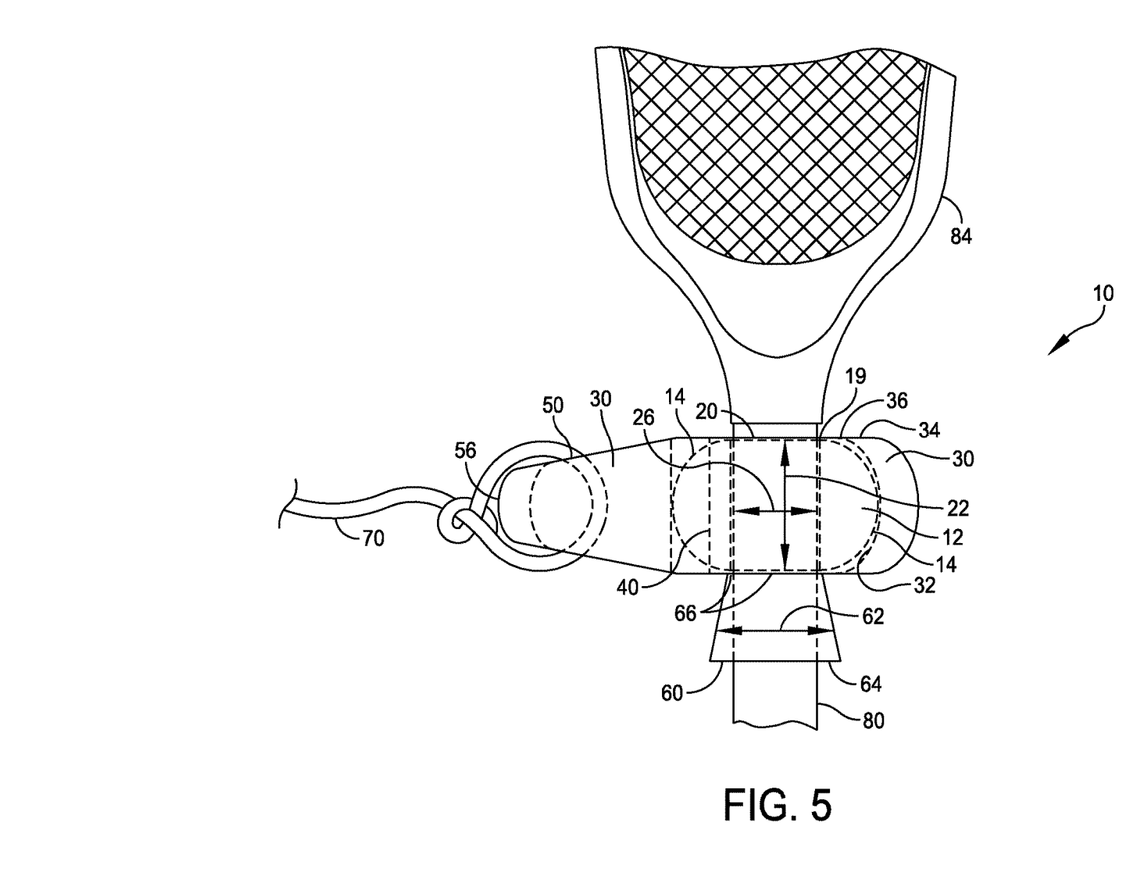
FIG. 5 illustrates an exemplary embodiment of wedging a swiveling connector to a lacrosse stick for connecting a tensioning member.

Continuing, in various embodiments, bore cross section 17 may be polygonal to engage a shaft 80 with a polygonal cross section (FIGS. 1, 2a, 3a, 3d, 6a-6b, and 7). For example, a shaft of a lacrosse stick may be octagonal, whereas for round sports sticks, such as for baseball or golf, a round bore cross section 17 may be chosen for securely engaging shaft 80. Still other sports sticks, such as hockey, may have a flat shaft 80 and may require bore cross section 17 to be rectangular. An appropriate inner element 12 may be selected to match the shaft cross section of the chosen sports stick, and element 12 may be placed onto shaft 80 for resistance training. Referring to FIGS. 4 and 5, in an embodiment, a lacrosse player may select a natural fulcrum 72 for providing resistance at a location on the sports shaft 80 that best develops strength, agility, reaction time, and/or proprioceptive awareness. Tensioning member 70 may then be attached to arching portion 50 at one end and to anchor 76 at the other end. Preferably, this arrangement may afford several feet of resisted lateral movement.

Figure 2B:
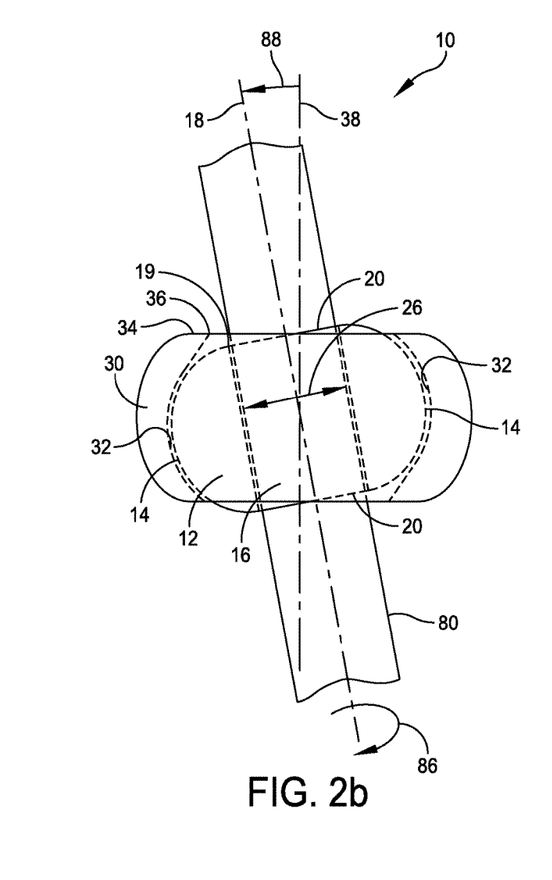

Referring to FIGS. 2b and 4-5, in various embodiments, once the connector system has engaged shaft 80, bore axis 18 may freely deviate 88 (FIG. 2b) from collar axis 38 by at least approximately 30 degrees, and may deviate by 60 degrees or more without interference from collar ends 34. Generally, shaft 80 may prevent inner element 12 from decoupling from retaining collar 30. Universal movement of shaft 80 may approach a theoretical maximum axial deviation 88 of ninety degrees and may reach a limit upon striking collar end 34. In an embodiment, a maximally deviated shaft 80 may strike the opening inner rim 36 of collar end 34, thus preventing inner element 12 from de-inserting from retaining collar 30. Unlike other shaft attachment methods, such as clamps, eye-bolts, or Velcro®, the disclosed connecting system 10 beneficially surrounds shaft 80 and provides a uniform and untangled attachment point over 360 degrees of shaft rotation 86 (FIG. 2b). Referring to FIGS. 2a, 3a, and 3d, in an embodiment, a bore rim 19 of element bore 16 may have curved edges 28 for sliding onto an end of the shaft easily, especially useful if the end of the shaft has sharp edges.

Referring now to FIGS. 1, 2a-2b, 3a-3d, and 5, in various embodiments, retaining collar 30 may include an insertion slot 40 gapping a perimeter of the spherical inner surface 49 (FIG. 3b) and extending radially outwardly by a slot depth 44 to provide an insertion clearance 46 for receiving the inner element 12 sideways during insertion and removal. Insertion slot 40 may have a gap width 42 greater than an element length 22 between truncated ends 20. Preferably, gap width 42 may be configured to provide minimal clearance for element length 22 so that element 12 is generally self-retained within collar 30 without the presence of shaft 80. In an embodiment, perimeter 49 may enclose element spherical outer surface 14 over an arc of between 180° and 360° while the gap in perimeter 49 may be less than 180°. Slot depth 44 may be sufficiently deep for element spherical outer surface 14 to clear an opening inner rim 36 of collar end 34 when inner element 12 is moved, along collar axis 38, into or out of the insertion clearance 46 region of space.

Continuing with FIGS. 1, 2a, 3a-3d, and 5, in various embodiments, retaining collar 30 may be oval shaped with an oval apex 56 of the oval-shaped collar positioned over insertion slot 40, where the oval apex 56 and insertion clearance 46 together define the arching portion 50. Beneficially, aligning oval apex 56 with insertion slot 40 may provide a dual benefit of establishing an external attachment point 50 and creating an entry socket 46 for field assembly of connecting system 10. Such a novel combination may enable molding the retaining collar 30 in one piece because of the simple lines of such a structure. For example, collar 30 may be molded of plastic, resin, fiberglass, carbon fiber, metal, or other material known in the art. Additionally, inner element may be molded in one piece. Referring to FIGS. 3a-3d, an inner element 12 having bore diameter 26 and an octagonal bore cross section 17 (FIG. 3a) may be turned sideways with its bore axis 18 (not shown) at 90° to collar axis 38 (not shown) and then aligned with a radial 48 of the insertion slot (FIG. 3b) for dropping into insertion pocket 46 and held with one hand (FIG. 3c). Sideways element 12 may then be moved from the arching portion 50 toward a seated position against spherical inner surface 32 and then rotated 90° into a nominal plane of rotation (not shown) for universal operation.

Figure 6A:
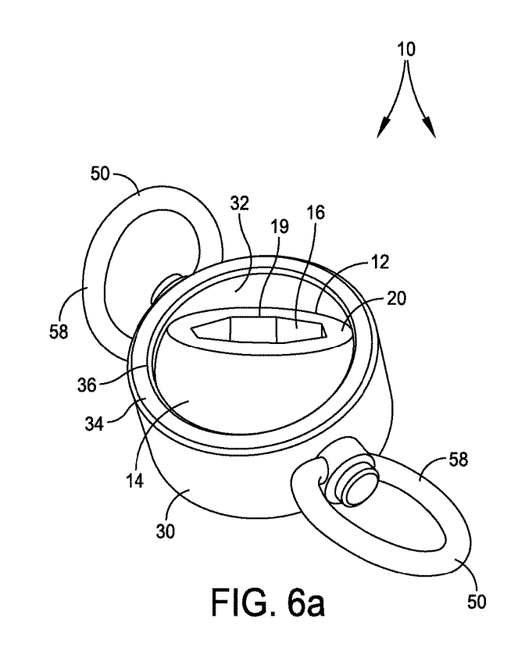
FIGS. 6a and 6b illustrate an exemplary embodiment of a ball and collar formed of mating halves for connecting a tensioning member to a free-space shaft.
Figure 6B:
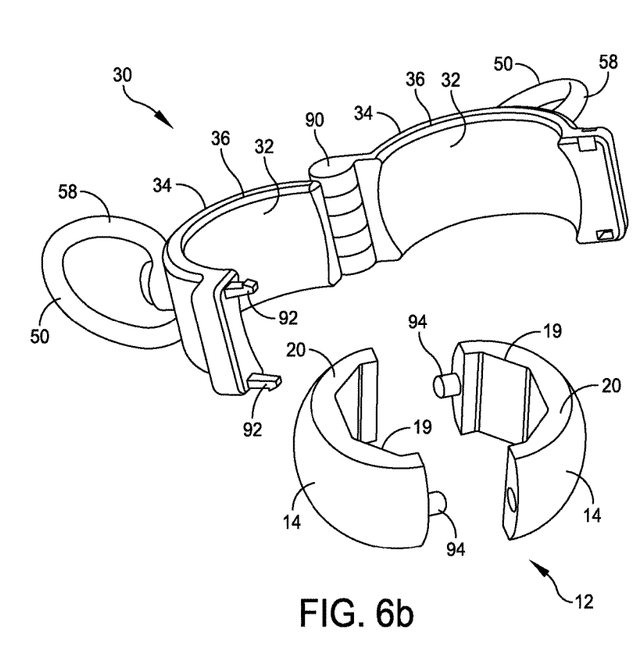
Figure 7:
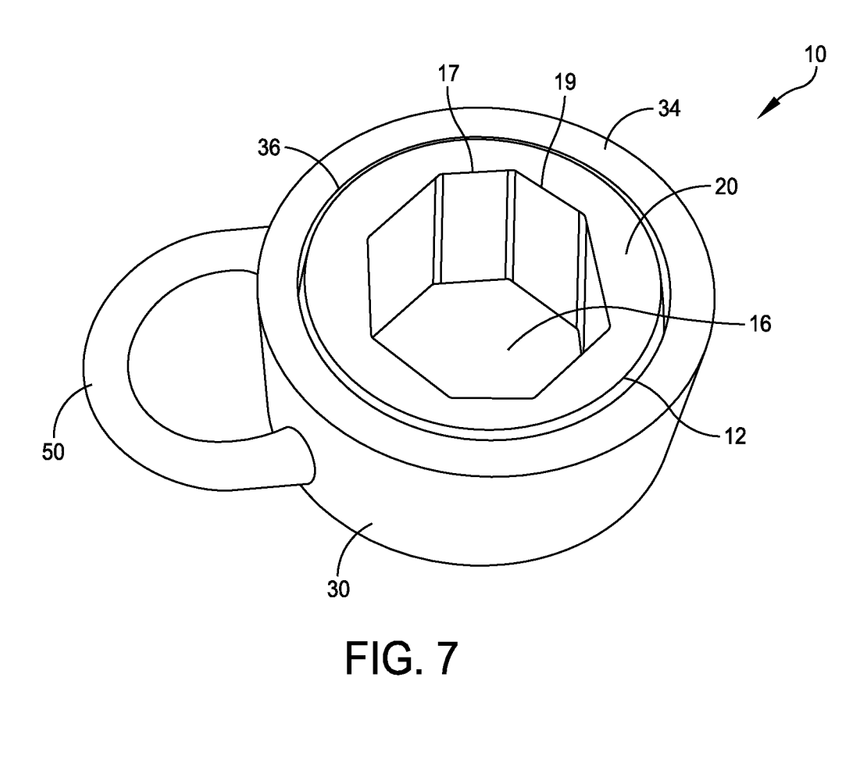
FIG. 7 illustrates an exemplary embodiment of a bearing assembly for connecting a tensioning member to a free-space shaft.

Referring now to FIGS. 6a-6b and 7, in various embodiments, a slotless version of connecting system 10 may comprise inner element 12 and retaining collar 30 each being formed of two (or more) arcing sections, providing a convenient alternative to the slotted assembly described in FIGS. 1, 2a-2b, and 3a-3d. Two arcing element sections may be fastened by fasteners 94 around shaft 80 to form inner element 12. Two arcing collar sections joined by collar hinge 90 may be clamped by fasteners 92 around inner element 12 to form connecting assembly 10. Attachment rings 58 may provide arching portions 50 exteriorly to collar 30 for attaching tensioning member 70 to a pivot point 72 for resistance training. Alternately, a permanent bearing may be formed (FIG. 7) and may have a single attachment ring 58 disposed on collar 30. A permanent bearing may be manufactured using heating and cooling molds. In an embodiment, a permanent bearing may engage shaft 80 frictionally, wedged in place using a rubber sleeve or stopper (FIG. 5), or bracketed on one end by a playing head 84 (FIGS. 4-5). Arching portion 50 may be configured to receive tensioning member 70 by at least one of a hook, a carabiner, a clip, a knot, Velcro®, and a snap.

Referring now to FIG. 5, in an embodiment, inner element 12 is configured to stop against a stopper ring 60 disposed circumferentially on shaft 80 for positioning the inner element on the shaft without substantially interfering with the universal motion of bore axis 18. Stopper ring 60 may have a stopper outer diameter 62 larger than a bore diameter 26 of element bore 16 for resisting against the truncated end 20 of element 12. For example, truncated end 20 may be sufficiently exposed by collar end 34 so that end 20 butts up against stopper ring 60 without unduly limited axial deviation of bore axis 18. In an embodiment, stopper ring 60 may be a rubber sleeve 64 frictionally positionable on shaft 80 and may have a stopper thin end 66 facing inner element 12. Element bore 16 may be configured to receive the thin end 66 within the element bore for wedging inner element 12 to shaft 80. Alternately, in an embodiment, bore cross section 17 may be configured to receive thin end 66 within element bore 16 for wedging inner element 12 to shaft 80. Rubber sleeve 64 may be conical in shape, tapering from a larger stopper outer diameter 62 to a smaller diameter at stopper thin end 66 in order resist connecting assembly 10 in a direction opposite stopper ring 60. For example, lacrosse playing head 84 may form a limit on an upper side of connecting assembly 10 while stopper ring 60 may form a limit on a lower side of assembly 10.

Continuing, in various embodiments, tensioning member 70 may be an elastic band, a bungee cord, or may be a rigid member conveying tension or compression forces from a mechanism such as an exercise machine, a weight machine, a suspension system, a physical therapy device, or other uses where a shaft undergoes a wide and universal range of motion. In an embodiment, two or more tensioning members 70 may be attached to connecting system 10 via one or more arching portions. Preferably, in an embodiment, retaining collar 30 may be symmetrical on either end of collar axis 38 and may then allow element 12 to be inserted into either end of retaining collar 30, simplifying the use of connecting system 10.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A connecting system for connecting a tensioning member to a free-space shaft, comprising
    an inner element having an element spherical outer surface truncated at opposite truncated ends and including an element bore extending through the inner element and coaxial with the element spherical outer surface, the element bore having a bore axis and a bore cross section sized and configured complementary to a shaft cross section of the free-space shaft, and wherein the inner element is configured to stop against a stopper ring disposed circumferentially on the shaft for positioning the inner element on the shaft without substantially interfering with the universal motion of the bore axis, the stopper ring having a stopper outer diameter larger than a bore diameter of the element bore;
    a retaining collar having a collar spherical inner surface being complementary to and configured to receive the element spherical outer surface and having opposing collar ends, the collar spherical inner surface defining a collar axis, the retaining collar allowing universal motion of the bore axis relative to the collar axis; and
    the retaining collar including an arching portion for attaching the tensioning member thereto, and the retaining collar connecting the tensioning member to the shaft.

2. The connecting system of claim 1, wherein:
the bore cross section is polygonal and is sized to receive a complementary-shaped shaft.

3. The connecting system of claim 2, wherein:
a rim of the element bore has curved edges for sliding onto an end of the shaft easily.

4. The connecting system of claim 2, wherein:
the bore cross section is octagonal for receiving a shaft of a lacrosse stick.

5. The connecting system of claim 1, wherein:
the stopper ring is a rubber sleeve frictionally positionable on the shaft and having a stopper thin end for facing the inner element, the bore diameter being configured to receive the thin end within the element bore for wedging the inner element to the shaft.

6. The connecting system of claim 1, wherein:
the retaining collar is composed of multiple arcing portions for fastening around and slidably retaining the inner element.

7. The connecting system of claim 1, wherein:
the bore axis freely deviates from the collar axis by at least approximately 30 degrees when the element bore is engaging the shaft.

8. The connecting system of claim 1, further comprising:
the retaining collar including an insertion slot gapping a perimeter of the spherical inner surface and extending radially outwardly by a slot depth to provide an insertion clearance for receiving the inner element sideways during insertion and removal, the insertion slot having a gap width greater than an element length between the truncated ends, the slot depth being sufficiently deep for the element spherical outer surface to clear an opening inner rim of the collar end when the inner element is moved along the collar axis into or out of the insertion clearance.

9. The connecting system of claim 8, wherein:
the retaining collar is oval shaped with an oval apex of the oval-shaped collar positioned over the insertion slot, where the oval apex and the insertion clearance together define the arching portion.

10. The connecting system of claim 1, wherein:
the arching portion is an attachment ring disposed exteriorly on the retaining collar.

11. A connecting system for connecting a tensioning member to a free-space shaft, comprising:
an inner element having an element spherical outer surface truncated at opposite truncated ends and including an element bore extending through the inner element and coaxial with the element spherical outer surface, the element bore having a bore axis and being configured for receiving the free-space shaft, wherein the inner element is configured to stop against a stopper ring disposed circumferentially on the shaft for positioning the inner element on the shaft without substantially interfering with the universal motion of the bore axis, the stopper ring having a stopper outer diameter larger than a bore diameter of the element bore;
a retaining collar having a collar spherical inner surface being complementary to and configured to receive the element spherical outer surface and having opposing collar ends, the collar spherical inner surface defining a collar axis, the retaining collar allowing universal motion of the bore axis relative to the collar axis;
the retaining collar including an insertion slot gapping a perimeter of the spherical inner surface and extending radially outwardly by a slot depth to provide an insertion clearance for receiving the inner element sideways during insertion and removal, the insertion slot having a gap width greater than an element length between the truncated ends, the slot depth being sufficiently deep for the element spherical outer surface to clear an opening inner rim of the collar end when the inner element is moved along the collar axis into or out of the insertion clearance; and
wherein the retaining collar is oval shaped with an oval apex of the oval-shaped collar positioned over the insertion slot, the oval apex and the insertion clearance together defining an arching portion for attaching the tensioning member thereto, and the retaining collar connecting the tensioning member to the shaft.

12. The connecting system of claim 11, wherein:
the element bore has a bore cross section sized and configured complementary to a shaft cross section of the free-space shaft.

13. The connecting system of claim 12, wherein:
the bore cross section is polygonal and is sized to receive a complementary-shaped shaft.

14. The connecting system of claim 12, wherein:
a rim of the element bore has curved edges for sliding onto an end of the shaft easily.

15. The connecting system of claim 11, wherein:
the stopper ring is a rubber sleeve frictionally positionable on the shaft and having a stopper thin end for facing the inner element, the bore diameter being configured to receive the thin end within the element bore for wedging the inner element to the shaft.

16. The connecting system of claim 11, wherein:
the bore axis freely deviates from the collar axis by at least approximately 30 degrees when the element bore is engaging the shaft.

17. The connecting system of claim 11, wherein:
the arching portion is configured for receiving the tensioning member by at least one of a hook, a carabiner, a clip, a knot, Velcro®, and a snap.

18. The connecting system of claim 11, wherein
the retaining collar is molded in one piece.

* * * * *